US009368986B1

(12) United States Patent
Juma

(10) Patent No.: US 9,368,986 B1
(45) Date of Patent: Jun. 14, 2016

(54) VEHICLE REMINDER AND CHARGING DEVICE

(71) Applicant: Joseph Juma, Columbus, OH (US)

(72) Inventor: Joseph Juma, Columbus, OH (US)

(*) Notice: Subject to any disclaimer, the term of this patent is extended or adjusted under 35 U.S.C. 154(b) by 0 days.

(21) Appl. No.: 14/658,373

(22) Filed: Mar. 16, 2015

(51) Int. Cl.
H04B 1/38 (2015.01)
H02J 7/00 (2006.01)
G11B 23/00 (2006.01)

(52) U.S. Cl.
CPC ............ *H02J 7/0047* (2013.01); *G11B 23/00* (2013.01); *H02J 7/0027* (2013.01); *H02J 7/0052* (2013.01); *H02J 2007/0062* (2013.01)

(58) Field of Classification Search
CPC ..... H02J 7/0047; H02J 7/0052; H02J 7/0027; H02J 2007/0062; G11B 23/00
USPC ................. 455/573, 572, 575.1, 569.2, 550.1
See application file for complete search history.

(56) References Cited

U.S. PATENT DOCUMENTS

| 4,222,028 A | 9/1980 | Danchilla |
| 5,200,688 A | 4/1993 | Patino et al. |
| 5,479,735 A | 1/1996 | Martin, Jr. |
| 6,008,723 A | 12/1999 | Yassan |
| 6,076,000 A | 6/2000 | Lee |
| 6,509,716 B2 | 1/2003 | Yi |
| 6,580,929 B1 | 6/2003 | Chiu |
| 6,788,026 B2 | 9/2004 | Muramatsu |
| 7,130,666 B2 | 10/2006 | Eisenbraun |
| 7,196,293 B2 | 3/2007 | Britto |
| 7,274,169 B2 | 9/2007 | Burgan et al. |
| 7,408,445 B1 | 8/2008 | Cunningham |
| 7,973,512 B2 | 7/2011 | Sage et al. |
| 8,570,168 B2* | 10/2013 | Logan .................. H04Q 9/00 340/539.32 |
| 8,727,397 B1 | 5/2014 | McDonald |
| 8,886,393 B2 | 11/2014 | Edwards et al. |
| 2004/0204177 A1* | 10/2004 | Pon .................... H02J 7/0045 455/573 |
| 2005/0032554 A1 | 2/2005 | Yang |
| 2006/0290319 A1 | 12/2006 | Burgan et al. |
| 2007/0205744 A1 | 9/2007 | Corbins |
| 2007/0238350 A1* | 10/2007 | Azoulay ............. H01R 31/065 439/501 |
| 2008/0284371 A1* | 11/2008 | Hsu .................... H01M 10/44 320/111 |
| 2010/0271202 A1 | 10/2010 | Lin |
| 2012/0293341 A1 | 11/2012 | Lin |
| 2013/0178252 A1 | 7/2013 | Sorias et al. |
| 2013/0226371 A1 | 8/2013 | Rovik et al. |
| 2013/0281023 A1 | 10/2013 | Madanarajagopal et al. |
| 2014/0055276 A1 | 2/2014 | Logan et al. |
| 2014/0235298 A1 | 8/2014 | Sorias et al. |
| 2014/0300461 A1 | 10/2014 | Stark |
| 2014/0325113 A1 | 10/2014 | Frye et al. |
| 2015/0263551 A1* | 9/2015 | Caren .................. H02J 7/0042 455/569.1 |

FOREIGN PATENT DOCUMENTS

CN 202042038 11/2011

* cited by examiner

Primary Examiner — Khai M Nguyen
(74) Attorney, Agent, or Firm — Mitchell A Rossman; Terra Nova Patent Law, PLLC

(57) ABSTRACT

The present invention provides a message reminder and charging device for a portable electronic device for use in a vehicle having an electrical receptacle. The message reminder and charging device includes: a housing; a charging device; and a message recording and reminder device In one embodiment, the portable electronic device includes a cellular phone, an external backup battery, a MP3 music player, a tablet computer, laptop computer, a personal digital assistant, a video game console, or a combination thereof. Methods of generating reminder messages are also provided.

20 Claims, 10 Drawing Sheets

VEHICLE REMINDER AND CHARGING DEVICE

BACKGROUND OF THE INVENTION

The accessory port of an automobile typically provides 12-volt electrical power to operate portable electrical devices. The 12-volt power is transformed by an accessory adapter into power suitable for the portable electrical devices. Suitable portable electronic devices include, for example, cellular phones and computers.

However, none of the current devices allow for the accessory adapter to play a prerecorded message to the user when the accessory adapter is activated or deactivated.

What is needed is an accessory adapter that provides power suitable for portable electronic devices and also plays prerecorded messages.

SUMMARY OF THE INVENTION

The present invention provides a message reminder and charging device for a portable electronic device for use in a vehicle having an electrical receptacle. The message reminder and charging device includes: a housing; a charging device; and a message recording and reminder device. The portable electronic device may include a cellular phone, an external backup battery, a MP3 music player, a tablet computer, laptop computer, a personal digital assistant, a video game console, or a combination thereof. Methods of generating reminder messages are also provided.

The advantages of the present invention include, for example, the ability to save lives, to save money, to save time, to prevent property theft, to prevent health complications, and the like by reminding the user of important information that they might need before embarking on their drive or prior to exiting the vehicle. This information, which is broadcasted by the device either when the ignition is turned on, when the device is plugged into the vehicle electrical receptacle, when the vehicle door is opened and closed for vehicles with automatic starters, and for when the ignition is turned off, or when the device is unplugged out of the vehicle electrical receptacle can be company default message or can be pre-recorded information. Several examples of this information may include a message reminding the user to not to forget a baby in the vehicle, a message reminding the user to wear their seatbelt, a message reminding the user not to drive under the influence of alcohol, a message reminding the user not to text and drive, a message reminding the user of an important event, a message reminding the user of certain goods and services, a message reminding the user to take a medication, a message reminding the user to lock their vehicle, a message reminding the user to buy groceries, and the like. In other words, the present invention enables the user to be reminded of important information prior to starting their vehicle or leaving their vehicle.

The present invention provides a message reminder and charging device for a portable electronic device for use in a vehicle having an electrical receptacle. The message reminder and charging device includes: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one or more positive electrical contacts for electrically communicating with one or more complementary positive electrical contacts disposed within the vehicle electrical receptacle; one or more negative electrical contacts for electrically communicating with one or more complementary negative electrical contacts disposed within the vehicle electrical receptacle; and one or more Universal Serial Bus (USB) receptacles that each independently protrude from the distal end or from the exterior surface of the housing, wherein the charging integrated circuit is in electrical communication with the one or more positive electrical contacts, the one or more negative electrical contacts, and the one or more Universal Serial Bus (USB) receptacles; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing.

In one embodiment, the portable electronic device includes a cellular phone, an external backup battery, a MP3 music player, a tablet computer, laptop computer, a personal digital assistant, a video game console, or a combination thereof.

In one embodiment, the portable electronic device includes a cellular phone. In one embodiment, the portable electronic device includes a MP3 music player. In one embodiment, the portable electronic device includes a tablet computer. In one embodiment, the portable electronic device includes a personal digital assistant.

In one embodiment, the portable electronic device includes a video game console. In one embodiment, the one or more Universal Serial Bus (USB) receptacles each independently comprise one or more Type A Universal Serial Bus (USB) receptacles, one or more Type B Universal Serial Bus (USB) receptacles, one or more Mini-A Universal Serial Bus (USB) receptacles, one or more Mini-AB Universal Serial Bus (USB) receptacles, one or more Mini-B Universal Serial Bus (USB) receptacles, one or more Micro-AB Universal Serial Bus (USB) receptacles, one or more Micro-B Universal Serial Bus (USB) receptacles, or a combination thereof.

In one embodiment, the one or more Universal Serial Bus (USB) receptacles are each independently located at a distal end of the housing. In one embodiment, the one or more Universal Serial Bus (USB) receptacles are each independently located on the external surface of the housing.

In one embodiment, the first push button is used to record a first customized message to be broadcasted when a vehicle ignition is turned on or when the message reminder and charging device is plugged into the vehicle electrical receptacle. In one embodiment, the second push button is used to record a first customized message to be broadcasted when a vehicle ignition is turned off or when the message reminder and charging device is unplugged from the electrical receptacle of a vehicle.

In one embodiment, the first push button is pressed three times by the user to delete the first customized message. At that point, the first default message will be played when the message reminder and charging device is plugged into the vehicle electrical receptacle or when the vehicle ignition is turned on.

In one embodiment, the second push button is pressed three times by the user to delete the second customized message. At that point, the second default message will be played when the message reminder and charging device is unplugged from the vehicle electrical receptacle or when the car ignition is turned off.

In one embodiment, the message reminder and charging device further includes an earphone receptacle on the exterior surface of the housing and in electrical communication with the message recording and reminder device.

In one embodiment, the charging device converts an electrical power input at the vehicle electrical receptacle to a signal level accepted by the portable electronic device. In one embodiment, the electrical power input is received upon plugging the message reminder and charging device into the vehicle electrical receptacle when the vehicle is not running when an ignition key is turned to power an accessory power outlet.

In one embodiment, the electrical power input is received upon plugging the message reminder and charging device into the vehicle electrical receptacle when the vehicle is running. In one embodiment, the electrical power input is an automobile direct current (DC) power input.

In one embodiment, the message reminder and charging device further includes one or more Universal Serial Bus (USB) cables configured to each independently engage the one or more Universal Serial Bus (USB) receptacles. In one embodiment, the one or more Universal Serial Bus (USB) cables are connected to the portable electronic device.

The present invention provides a message reminder and charging system for a portable electronic device for use in a vehicle having an electrical receptacle. The message reminder and charging system includes: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one or more positive electrical contacts for electrically communicating with one or more complementary positive electrical contacts disposed within the vehicle electrical receptacle; one or more negative electrical contacts for electrically communicating with one or more complementary negative electrical contacts disposed within the vehicle electrical receptacle; and one or more Universal Serial Bus (USB) receptacles that each independently protrude from the distal end or from the exterior surface of the housing, wherein the charging integrated circuit is in electrical communication with the one or more positive electrical contacts, the one or more negative electrical contacts, and the one or more Universal Serial Bus (USB) receptacles; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, wherein the message recording and reminder device is in electrical communication to the charging integrated circuit disposed within the housing, and one or more vehicle door sensors in wireless communication with the message recording and reminder device.

The present invention provides a message reminder and charging device for a portable electronic device for use in a vehicle having an electrical receptacle. The message reminder and charging device includes: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the distal end or from the exterior surface of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing.

The present invention provides a message reminder and charging system for a portable electronic device for use in a vehicle having an electrical receptacle. The message reminder and charging system includes: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the distal end or from the exterior surface of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, wherein the message recording and reminder device is in electrical communication to the charging integrated circuit disposed within the housing, and one or more vehicle door sensors in wireless communication with the message recording and reminder device.

The present invention provides a message reminder and charging device for a cellular phone for use in a vehicle having an electrical receptacle. The message reminder and charging device includes: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the distal end of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing.

The present invention provides a message reminder and charging system for a cellular phone for use in a vehicle having an electrical receptacle. The message reminder and charging system includes: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the distal end of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, wherein the message recording and reminder device is in electrical communication to the charging integrated circuit disposed within the housing, and one or more vehicle door sensors in wireless communication with the message recording and reminder device.

The present invention provides a message reminder and charging device for a cellular phone for use in a vehicle having an electrical receptacle. The message reminder and charging device includes: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the exterior surface of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing.

The present invention provides a message reminder and charging system for a cellular phone for use in a vehicle having an electrical receptacle. The message reminder and charging system includes: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the exterior surface of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, wherein the message recording and reminder device is in electrical communication to the charging integrated circuit disposed within the housing; and one or more vehicle door sensors in wireless communication with the message recording and reminder device.

The present invention provides a method for generating a message from message reminder and charging device. The method includes: providing a message reminder and charging device for a portable electronic device for use in a vehicle having an electrical receptacle, the message reminder and charging device including: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one or more positive electrical contacts for electrically communicating with one or more complementary positive electrical contacts disposed within the vehicle electrical receptacle; one or more negative electrical contacts for electrically communicating with one or more complementary negative electrical contacts disposed within the vehicle electrical receptacle; and one or more Universal Serial Bus (USB) receptacles that each independently protrude from the distal end or from the exterior surface of the housing, wherein the charging integrated circuit is in electrical communication with the one or more positive electrical contacts, the one or more negative electrical contacts, and the one or more Universal Serial Bus (USB) receptacles; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing; inserting the message reminder and charging device into the vehicle electrical receptacle; detecting an electrical power input into the message reminder and charging device; generating an enabling signal in response to the detection of the electrical power input and generating a prerecorded message in response to the enabling signal, wherein the prerecorded message is stored in a computer readable medium within the message reminder and charging device.

The present invention provides a method for generating a message from message reminder and charging device. The method includes: providing a message reminder and charging device for a portable electronic device for use in a vehicle having an electrical receptacle, the message reminder and charging device including: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one or more positive electrical contacts for electrically communicating with one or more complementary positive electrical contacts disposed within the vehicle electrical receptacle; one or more negative electrical contacts for electrically communicating with one or more complementary negative electrical contacts disposed within the vehicle electrical receptacle; and one or more Universal Serial Bus (USB) receptacles that each independently protrude from the distal end or from the exterior surface of the housing, wherein the charging integrated circuit is in electrical communication with the one or more positive electrical contacts, the one or more negative electrical contacts, and the one or more Universal Serial Bus (USB) receptacles; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, wherein the message recording and reminder device is in electrical communication to the charging integrated circuit disposed within the housing, and one or more vehicle door sensors in wireless communication with the message recording and reminder device; inserting the message reminder and charging device into the vehicle electrical receptacle; detecting an electrical power input into the message reminder and charging device; generating an enabling signal in response to the detection of the electrical power input and generating a prerecorded message in response to the enabling signal, wherein the prerecorded message is stored in a computer readable medium within the message reminder and charging device.

The present invention provides a method for generating a message from message reminder and charging device. The method includes: providing a message reminder and charging device for a portable electronic device for use in a vehicle having an electrical receptacle, the message reminder and charging device including: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the distal end or from the exterior surface of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing, inserting the message reminder and charging device into the vehicle electrical receptacle; detecting an electrical power input into the message reminder and charging device; generating an enabling signal in response to the detection of the electrical power input and generating a prerecorded message in response to the enabling signal, wherein the prerecorded message is stored in a computer readable medium within the message reminder and charging device.

The present invention provides a method for generating a message from message reminder and charging device. The method includes: providing a message reminder and charging device for a portable electronic device for use in a vehicle having an electrical receptacle, the message reminder and charging device including: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the distal end or from the exterior surface of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing; inserting the message reminder and charging device into the vehicle electrical receptacle; detecting an electrical power input into the message reminder and charging device; generating an enabling signal in response to the detection of the electrical power input and generating a prerecorded message in response to the enabling signal, wherein the prerecorded message is stored in a computer readable medium within the message reminder and charging device.

The present invention provides a method for generating a message from message reminder and charging device. The method includes: providing a message reminder and charging device for a cellular phone for use in a vehicle having an electrical receptacle, the message reminder and charging device including: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the distal end of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing; inserting the message reminder and charging device into the vehicle electrical receptacle; detecting an electrical power input into the message reminder and charging device; generating an enabling signal in response to the detection of the electrical power input and generating a prerecorded message in response to the enabling signal, wherein the prerecorded message is stored in a computer readable medium within the message reminder and charging device.

The present invention provides a method for generating a message from message reminder and charging device. The method includes: providing a message reminder and charging device for a cellular phone for use in a vehicle having an electrical receptacle, the message reminder and charging device including: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the distal end of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing; inserting the message reminder and charging device into the vehicle electrical receptacle; detecting an electrical power input into the message reminder and charging device; generating an enabling signal in response to the detection of the electrical power input and generating a prerecorded message in response to the enabling signal, wherein the prerecorded message is stored in a computer readable medium within the message reminder and charging device.

The present invention provides a method for generating a message from message reminder and charging device. The method includes: providing a message reminder and charging device for a cellular phone for use in a vehicle having an electrical receptacle, the message reminder and charging device including: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the exterior surface of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing; inserting the message reminder and charging device into the vehicle electrical receptacle; detecting an electrical power input into the message reminder and charging device; generating an enabling signal in response to the detection of the electrical power input and generating a prerecorded message in response to the enabling signal, wherein the prerecorded message is stored in a computer readable medium within the message reminder and charging device.

The present invention provides a method for generating a message from message reminder and charging device. The method includes: providing a message reminder and charging device for a cellular phone for use in a vehicle having an electrical receptacle, the message reminder and charging device including: a housing having a proximal end, a distal end, and an exterior surface in between the proximal end and the distal end, wherein the proximal end of the housing is dimensioned for a slip fit engagement into a vehicle electrical receptacle, a charging device disposed within the housing and including: a charging integrated circuit; one positive electrical contact for electrically communicating with two complementary positive electrical contacts disposed within the vehicle electrical receptacle; two negative electrical contacts for electrically communicating with two complementary negative electrical contacts disposed within the vehicle electrical receptacle; and a Universal Serial Bus (USB) receptacle that protrudes from the exterior surface of the housing, wherein the charging integrated circuit is in electrical communication with the one positive electrical contact, the two negative electrical contacts, and the Universal Serial Bus (USB) receptacle; a message recording and reminder device disposed within the housing and including: a flash memory integrated circuit; a main control integrated circuit; an amplifier; a first push button; a second push button; a speaker; an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing; inserting the message reminder and charging device into the vehicle electrical receptacle; detecting an electrical power input into the message reminder and charging device; generating an enabling signal in response to the detection of the electrical power input and generating a prerecorded message in response to the enabling signal, wherein the prerecorded message is stored in a computer readable medium within the message reminder and charging device.

BRIEF DESCRIPTION OF THE DRAWINGS

Embodiments of the invention may be best understood by referring to the following description and accompanying drawings, which illustrate such embodiments. In the drawings.

Figure 1:
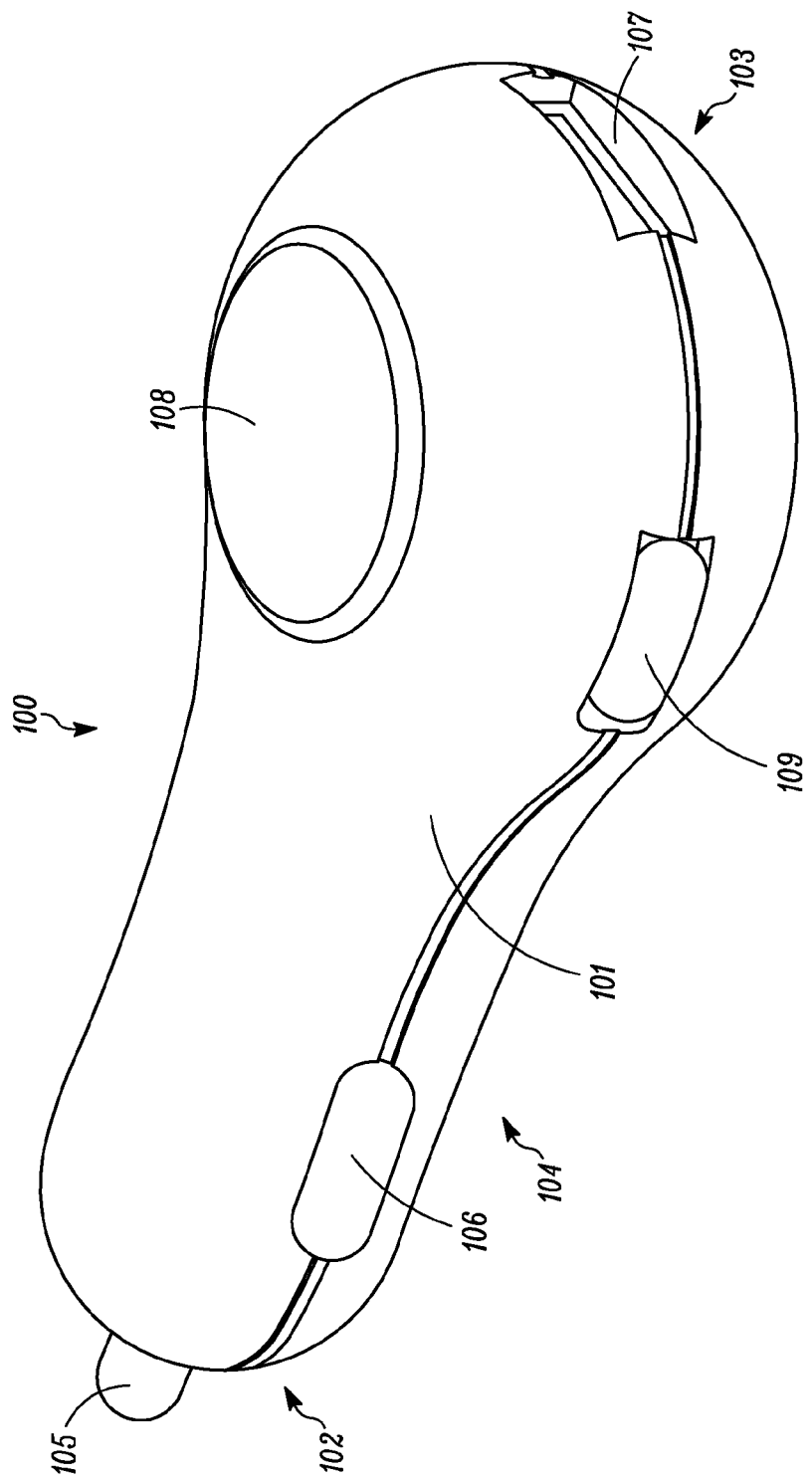
FIG. 1 is a perspective side-view drawing illustrating an exemplary message reminder and charging device.
Figure 2:
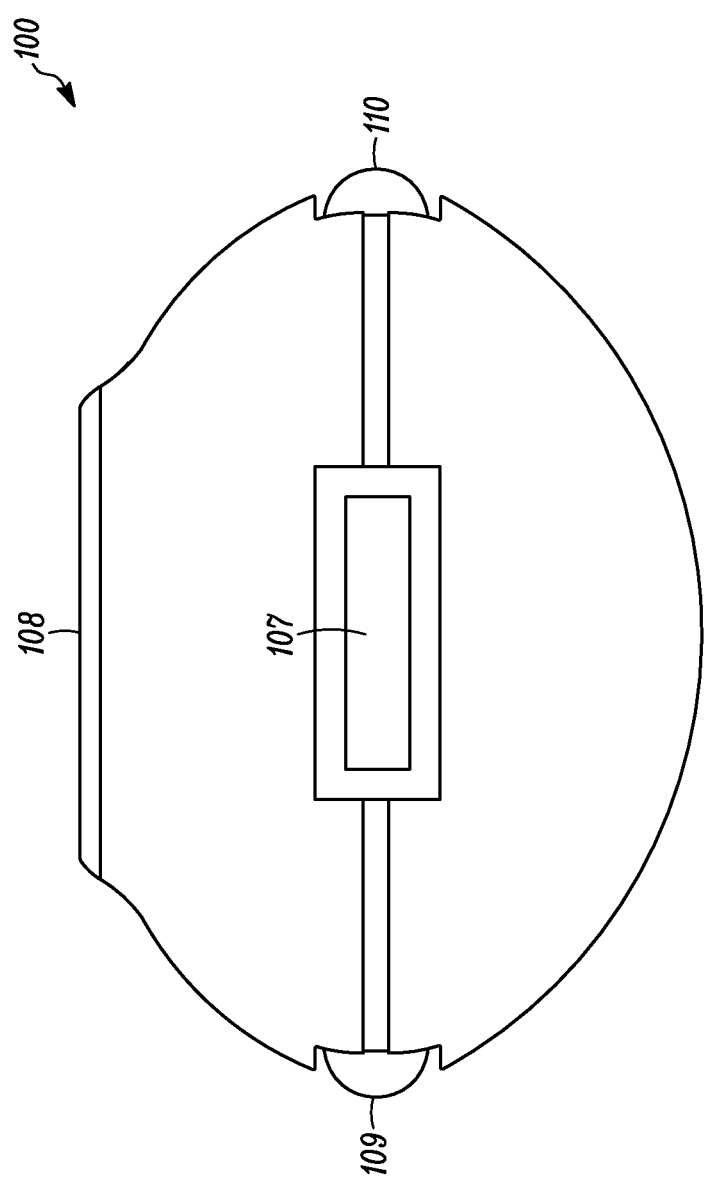
FIG. 2 is a rear-view drawing illustrating an exemplary message reminder and charging device.
Figure 3:
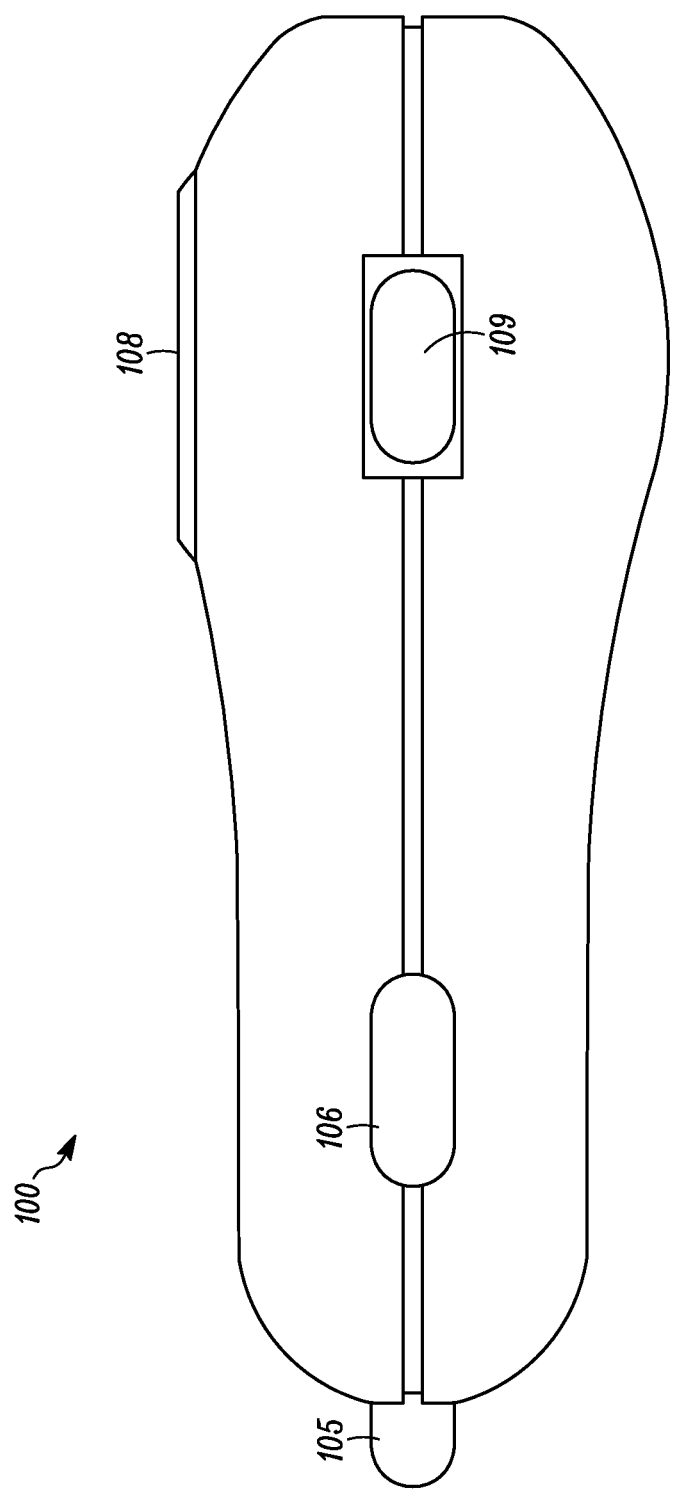
FIG. 3 is a side-view drawing illustrating an exemplary message reminder and charging device.
Figure 4:
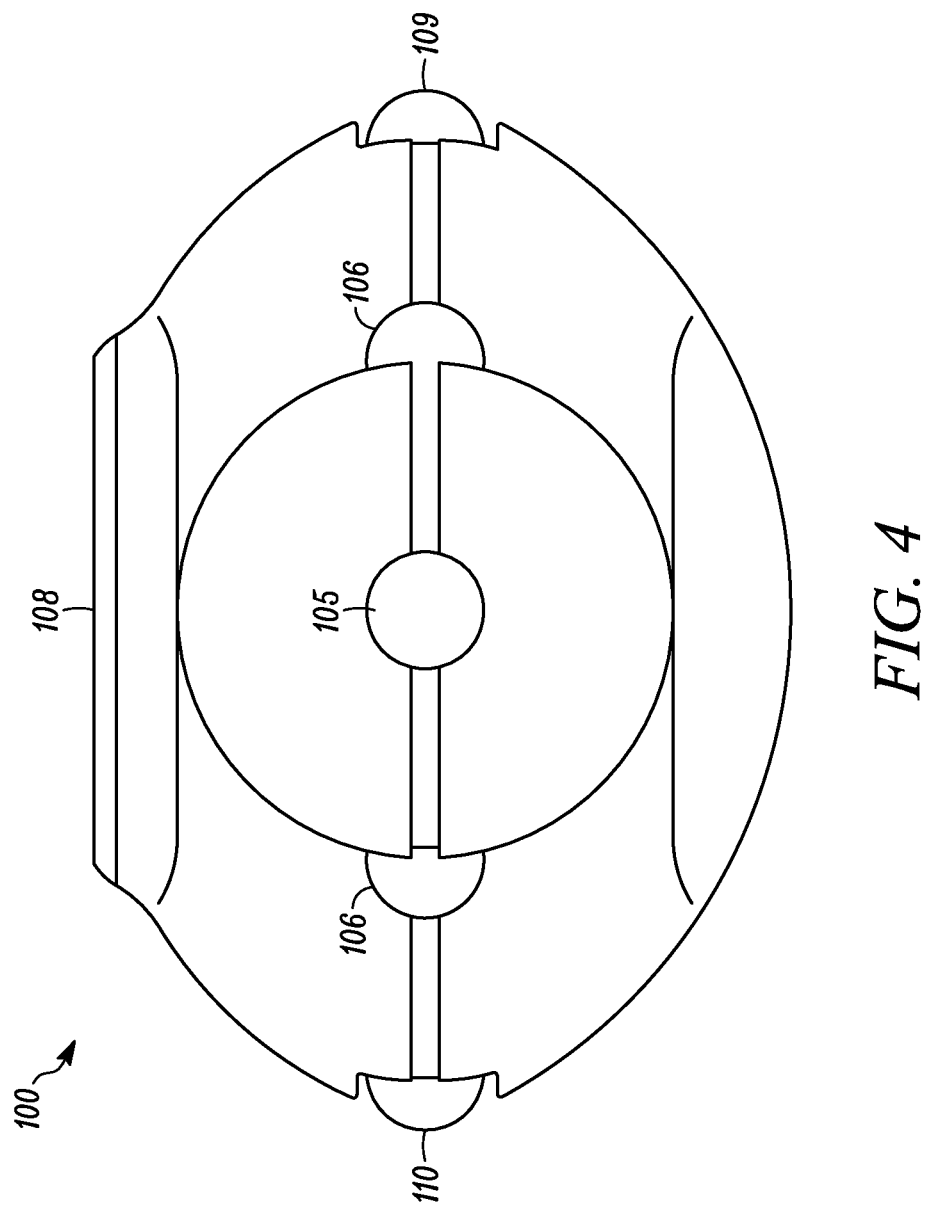
FIG. 4 is a front-view drawing illustrating various exemplary portable electronic devices.

The drawings are not necessarily to scale. Like numbers used in the figures refer to like components, steps, and the like. However, it will be understood that the use of a number to refer to a component in a given figure is not intended to limit the component in another figure labeled with the same number.

DETAILED DESCRIPTION OF THE INVENTION

The present invention provides a message reminder and charging device for a portable electronic device for use in a vehicle having an electrical receptacle. The message reminder and charging device includes: a housing; a charging device; and a message recording and reminder device The portable electronic device may include a cellular phone, an external backup battery, a MP3 music player, a tablet computer, laptop computer, a personal digital assistant, a video game console, or a combination thereof. Methods of generating reminder messages are also provided.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, M A, 1993 and *The American Heritage Dictionary of the English Language*, Houghton Mifflin, Boston Mass., 1981.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "amplifier" refers to any device or electronic circuit which has the capability to amplify an electrical audio signal to sufficient power for use by a coupled speaker.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the "battery" is used to describe a variety of electronic elements that can provide electrical energy. These may include any type of rechargeable battery (e.g., NiCad, NIMH, Lithium-Ion, etc.) or non-rechargeable battery (e.g., alkaline batteries, etc.). The term battery may also include organic batteries, inorganic batteries, combination organic and inorganic batteries, polymer batteries, etc. The term battery may also refer to other types of active and passive electronic devices capable of providing energy such as voltage regulators, current sources, capacitors, inductors, etc.

As used herein, the phrase "charging device" refers to any device for supplying power to a mobile or stationary device for the purpose of either charging its battery, operating the device at that moment in time, or both. For example, as is common in cellular phones, the power supply can operate the cellular phones, or charge its battery, or accomplish both tasks simultaneously. The charging device may include circuitry for driving a coil appropriately to generate an AC magnetic field, power or current sense or regulation circuitry, microcontrollers, and means of communication with a receiver, battery, or device. It may also be able to communicate data with a device or battery or perform other functions.

As used herein, the term "comprising" or "comprises" is intended to mean that the compositions and methods include the recited elements, but not excluding others.

As used herein, the term "computer" refers to any computing device including, for example, portable computers, laptops, mountable computers, or even desktop computers.

As used herein, the term "computer readable medium" refers to any device or system for storing and providing information (e.g., data and instructions) to a computer processor.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the phrase "direct current" refers to an electric current which flows in one direction only through a circuit or equipment creating a net ion flow. The phrase "direct current" includes both constant (continuous) and pulsed (interrupted) direct current.

As used herein, the term "in electronic communication" refers to electrical devices that are configured to communicate with one another through direct or indirect signaling.

As used herein, the word "exemplary" is used to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

As used herein, the phrase "flash memory integrated circuit" refers to an integrated circuit that stores data permanently.

As used herein, the phrase "integrated circuit (IC)" refers an electronic circuit formed on a small piece of semiconducting material, performing the same function as a larger circuit made from discrete components.

As used herein, the phrase "operatively coupled" refers to bringing two or more items together or into relationship with each other such that they may operate together or allow transfer of information between the two or more items.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "microphone" refers to an acoustic-to-electric transducer or sensor that converts sound in air into an electrical signal.

As used herein, the phrase "MP3 player" refers to a digital device capable of receiving wireless transmitted signals from the ether, or digital signals from a computer, and converting them into sound.

As used herein the term "personal digital assistant" refer to any hand-held portable devices, including, for example, computing devices.

As used herein, the phrase "recording device" refers to any device upon which information may be recorded.

As used herein, the term "sensors" includes hardware devices positioned within the interior of a vehicle, such as the door frame, for measuring pressure or light.

As used herein, the term "speaker" refers to an electroacoustic transducer that produces sound in response to an electrical audio signal input, for example, speakers convert electrical signals into audible signals.

As used herein, the term "Universal Serial Bus (USB)" means a serial bus standard to interface devices.

As used herein, the phrase "video game console" refers to a stand-alone system such as a PlayStation made by Sony, a computer and CPU such as a laptop or desktop computer, or a system of computers.

As used herein, the phrase "wireless communication" means transmission of data that generally can be over any air interface or suitable wireless network.

As used herein, the terms "front," "back," "rear," "upper," "lower," "right," and "left" in this description are merely used to identify the various elements as they are oriented in the FIGS, with "front," "back," and "rear" being relative apparatus. These terms are not meant to limit the element which they describe, as the various elements may be oriented differently in various applications.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

FIGS. 1-4 are various drawings illustrating an exemplary message reminder and charging device 100. The message reminder and charging device 100 includes a housing 101 that has a proximal end 102, a distal end 103, and an exterior surface 104 in between the proximal end 102 and the distal end 103. The proximal end 102 of the housing 101 is dimensioned for a slip fit engagement into a vehicle electrical receptacle (not shown).

The proximal end 102 of the housing 101 includes a positive electrical contact 105 for electrical communication with the complimentary positive contact of the vehicle electrical receptacle (not shown), and two negative electrical contacts 106 for engaging the complimentary electrical contacts of the vehicle electrical receptacle (not shown).

The distal end 103 of the housing 101 includes a Universal Serial Bus (USB) receptacle 107 to engage a Universal Serial Bus (USB) cable (not shown) to transmit power to a portable electronic device (not shown).

The exterior surface 104 of the housing 101 includes a speaker 108, a first push button 109, and a second push button 110.

In one embodiment, the speaker 108 also contains a microphone (not shown).

The Universal Serial Bus (USB) receptacle 107 may be a Type A Universal Serial Bus (USB) receptacle, a Type B Universal Serial Bus (USB) receptacle, a Mini-A Universal Serial Bus (USB) receptacle, a Mini-AB Universal Serial Bus (USB) receptacle, a Mini-B Universal Serial Bus (USB) receptacle, a Micro-AB Universal Serial Bus (USB) receptacle, or a Micro-B Universal Serial Bus (USB) receptacle.

In one embodiment, the first push button 109 is used to record a first customized message to be broadcasted when a vehicle ignition is turned on or when the message reminder and charging device 100 is plugged into the vehicle electrical receptacle (not shown). In one embodiment, the second push button 110 is used to record a second customized message to be broadcasted when a vehicle ignition is turned off or when the message reminder and charging device 100 is unplugged from the vehicle electrical receptacle (not shown).

In one embodiment, the first push button 109 is pressed three times by the user to delete the first customized message. At that point, the first default message will be played when the message reminder and charging device 100 is plugged into the vehicle electrical receptacle (not shown), or when the vehicle ignition is turned on.

In one embodiment, the second push button 110 is pressed three times by the user to delete the second customized message. At that point, the second default message will be played when the message reminder and charging device 100 is unplugged from the vehicle electrical receptacle (not shown) or when the vehicle ignition is turned off.

In one embodiment, the message reminder and charging device 100 includes a microphone (not shown) on the exterior surface 104 of the housing 101. In one embodiment, the microphone is included in the speaker 108.

In one embodiment, the message reminder and charging device 100 includes an earphone receptacle (not shown) on the exterior surface 104 of the housing 101.

Figure 5:
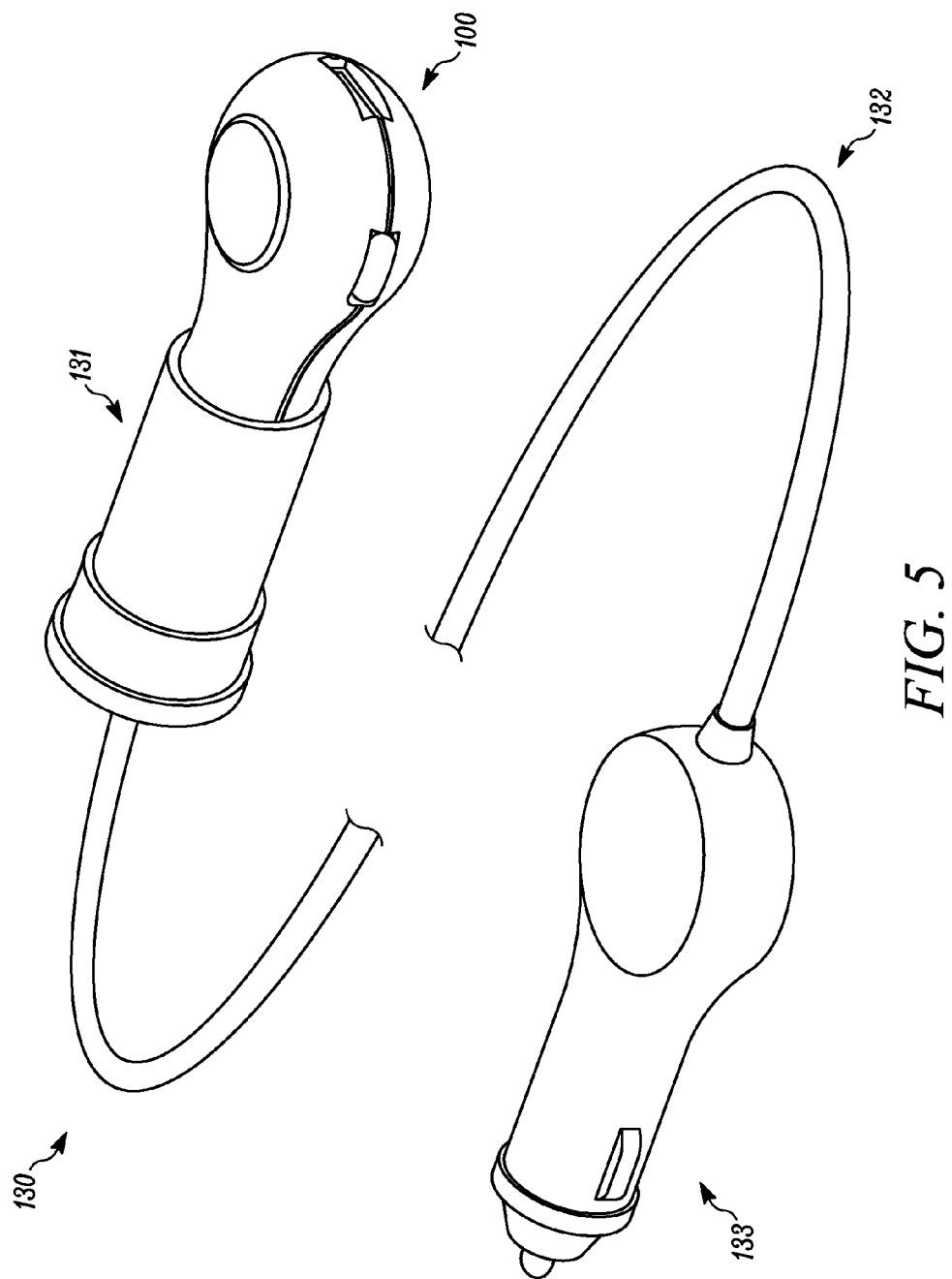
FIG. 5 is a perspective side-view drawing illustrating an exemplary message reminder and charging device with an extension plug.

FIG. 5 is a perspective side-view drawing illustrating an exemplary message reminder and charging device 100 with an extension plug 130. The extension plug 130 includes an acceptor head 131, a cord 132, and a remote plug 133.

Figure 6:
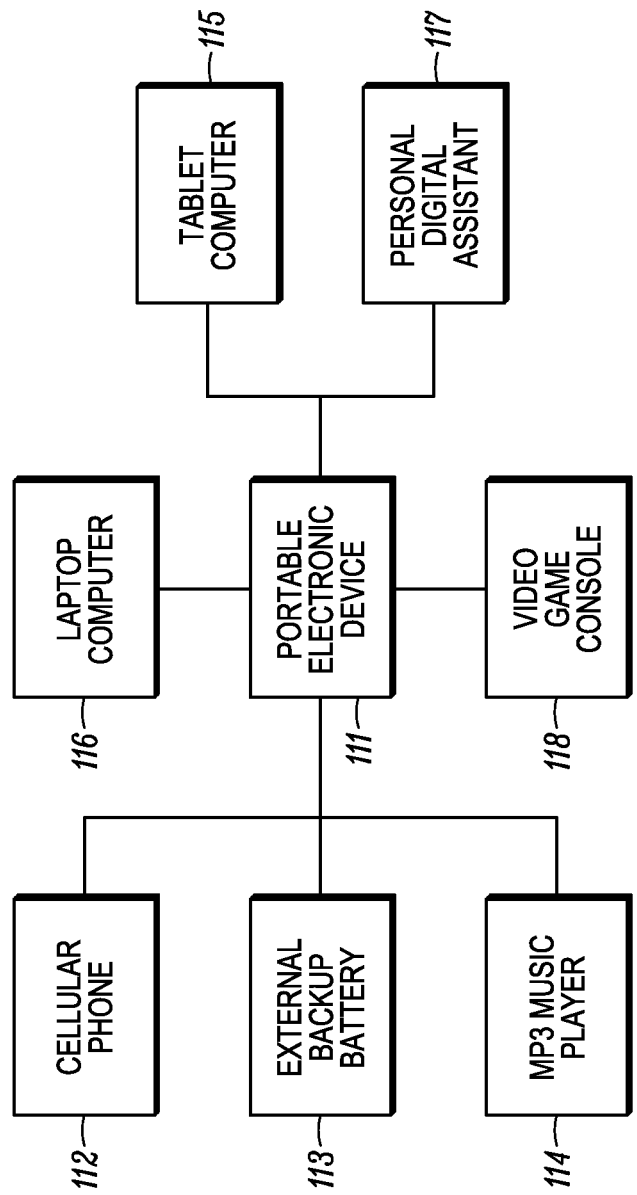
FIG. 6 is a block diagram illustrating an exemplary portable electronic device.

FIG. 6 illustrates the various embodiments of the portable electronic device 111. The portable electronic device 111 may be a cellular phone 112, an external backup battery 113, a MP3 music player 114, a tablet computer 115, laptop computer 116, a personal digital assistant 117, or a video game console 118.

In one embodiment, the portable electronic device 111 is a cellular phone 112. In one embodiment, the portable electronic device 111 is an external backup battery 113. In one embodiment, the portable electronic device 111 is a MP3 music player 114. In one embodiment, the portable electronic device 111 is a tablet computer 115. In one embodiment, the portable electronic device 111 is a laptop computer 116. In one embodiment, the portable electronic device 111 is a personal digital assistant 117. In one embodiment, the portable electronic device is a video game console 118.

Figure 7:
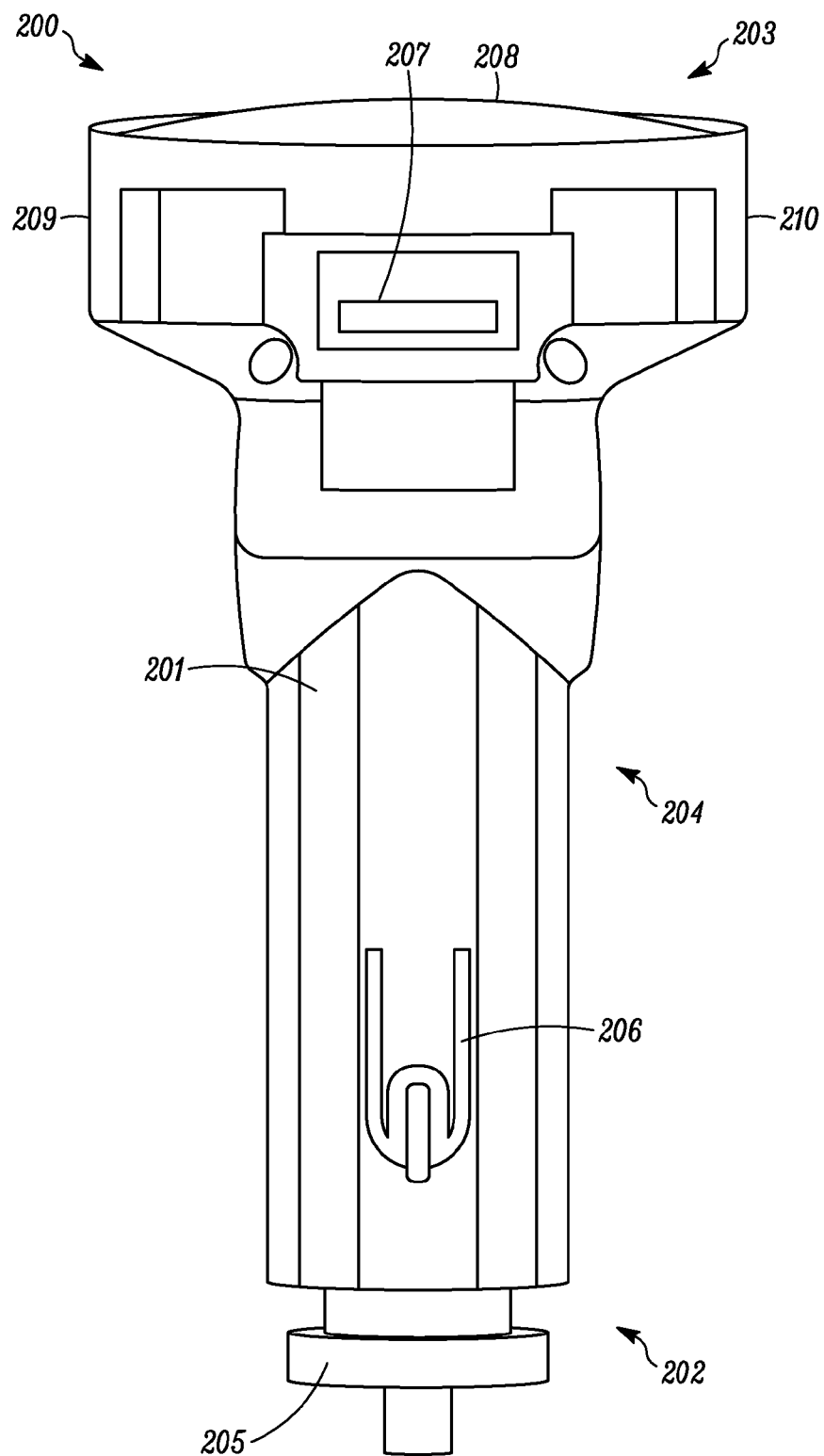
FIG. 7 is a side-view drawing illustrating an exemplary message reminder and charging device.

FIG. 7 is a drawing illustrating an exemplary message reminder and charging device 200. The message reminder and charging device 200 includes a housing 201 that has a proximal end 202, a distal end 203, and an exterior surface 204 in between the proximal end 202 and the distal end 203. The proximal end 202 of the housing 201 is dimensioned for a slip fit engagement into a vehicle electrical receptacle (not shown).

The proximal end 202 of the housing 201 includes a positive electrical contact 205 for electrical communication with the complimentary positive contact of the vehicle electrical receptacle (not shown), and two negative electrical contacts 206 for engaging the complimentary electrical contacts of the vehicle electrical receptacle (not shown).

The exterior surface 204 of the housing 201 includes a Universal Serial Bus (USB) receptacle 207 to engage a Universal Serial Bus (USB) cable (not shown) to transmit power to a portable electronic device (not shown).

The exterior surface 204 of the housing 201 includes a speaker 208, a first push button 209, and a second push button 210.

In one embodiment, the speaker 208 also contains a microphone (not shown).

The Universal Serial Bus (USB) receptacle 207 may be a Type A Universal Serial Bus (USB) receptacle, a Type B Universal Serial Bus (USB) receptacle, a Mini-A Universal Serial Bus (USB) receptacle, a Mini-AB Universal Serial Bus (USB) receptacle, a Mini-B Universal Serial Bus (USB) receptacle, a Micro-AB Universal Serial Bus (USB) receptacle, or a Micro-B Universal Serial Bus (USB) receptacle.

In one embodiment, the first push button 209 is used to record a first customized message to be broadcasted when a vehicle ignition is turned on or when the message reminder and charging device 200 is plugged into the vehicle electrical receptacle (not shown). In one embodiment, the second push button 210 is used to record a second customized message to be broadcasted when a vehicle ignition is turned off or when the message reminder and charging device 200 is unplugged from the vehicle electrical receptacle (not shown).

In one embodiment, the first push button 209 is pressed three times by the user to delete the first customized message. At that point, the first default message will be played when the message reminder and charging device 200 is plugged into the vehicle electrical receptacle (not shown) or when the vehicle ignition is turned on.

In one embodiment, the second push button 210 is pressed three times by the user to delete the second customized message. At that point, the second default message will be played when the message reminder and charging device 200 is unplugged from the vehicle electrical receptacle (not shown) or when the vehicle ignition is turned off.

In one embodiment, the message reminder and charging device 200 includes a microphone (not shown) on the exterior surface 204 of the housing 201. In one embodiment, the microphone (not shown) is included in the speaker 208.

In one embodiment, the message reminder and charging device 200 includes an earphone receptacle (not shown) on the exterior surface 204 of the housing 201.

Figure 8:
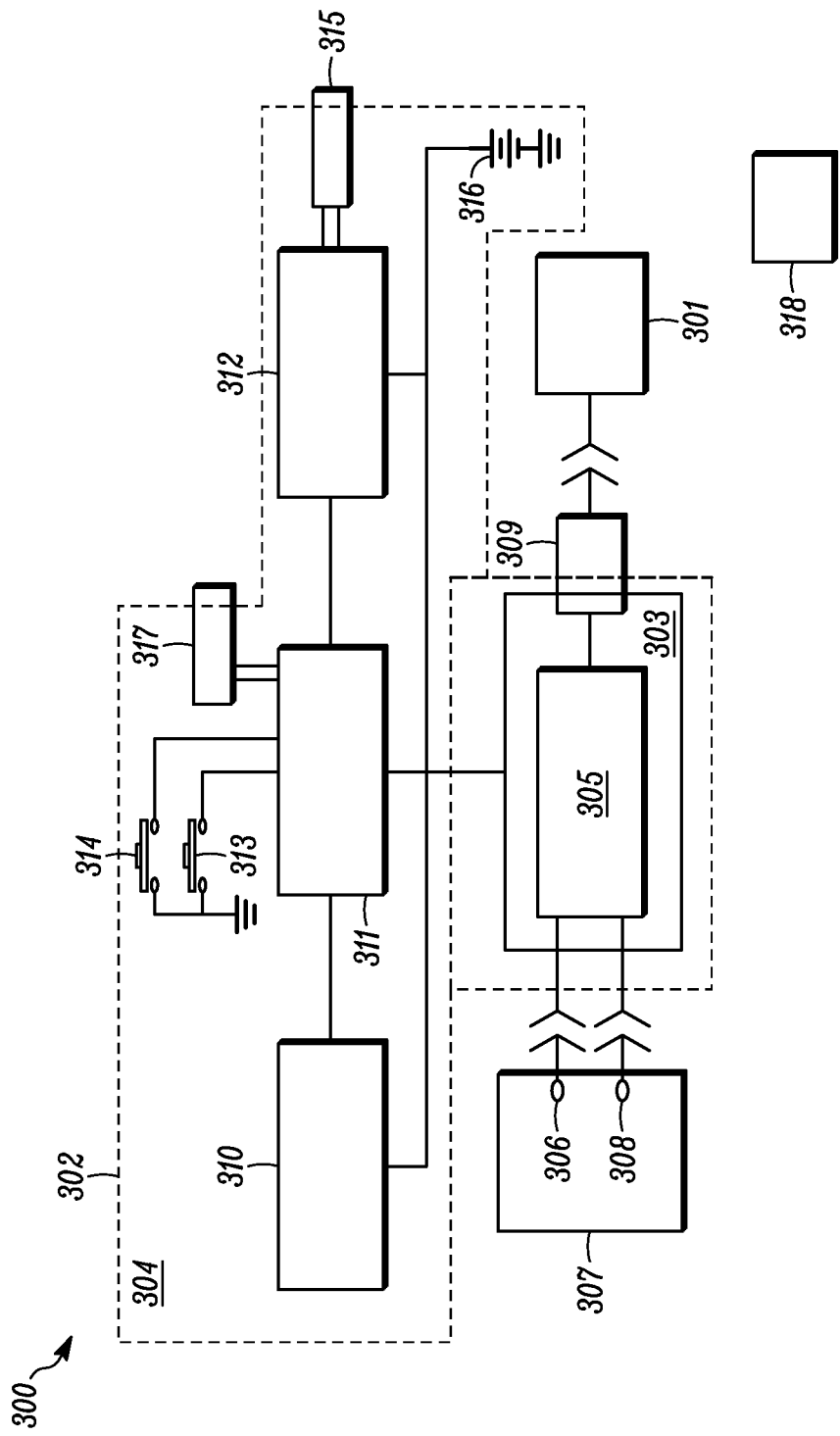
FIG. 8 is a block diagram illustrating an exemplary message reminder and charging device.

FIG. 8 illustrates an exemplary message reminder and charging device 300 for a portable electronic device 301 for use in a vehicle (not shown) having an electrical receptacle (not shown). The message reminder and charging device 300 includes: a housing 302, a charging device 303, and a message recording and reminder device 304.

The charging device 303 is disposed within the housing 302 and includes a charging integrated circuit 305, one positive electrical contact 306 for electrically communicating with two complementary positive electrical contacts (not shown) disposed within the vehicle electrical receptacle 307, two negative electrical contacts 308 for electrically communicating with two complementary negative electrical contacts (not shown) disposed within the vehicle electrical receptacle (not shown), and a Universal Serial Bus (USB) receptacle 309. The Universal Serial Bus (USB) receptacle 309 protrudes from the distal end or from the exterior surface of the housing 302. The charging integrated circuit 305 is in electrical communication with the one positive electrical contact 306, the two negative electrical contacts 308, and the Universal Serial Bus (USB) receptacle 309.

The message recording and reminder device 304 is disposed within the housing 302. The message recording and reminder device 304 includes a flash memory integrated circuit 310, a main control integrated circuit 311, an amplifier 312, a first push button 313, a second push button 314, a speaker 315, an auxiliary battery 316, and a microphone 317.

The flash memory integrated circuit 310 is in electrical communication with the main control integrated circuit 311. The main control integrated circuit 311 is in electrical communication with the first push button 313, the second push button 314, the microphone 317, and the amplifier 312. The amplifier 312 is in electrical communication with the speaker 315 and the flash memory integrated circuit 310. The message recording and reminder device 304 is in electrical communication to the charging integrated circuit 305 disposed within the housing 302.

A vehicle door sensor 318 is in wireless communication with the message recording and reminder device. In one embodiment, when the vehicle door sensor 318 determines that the vehicle door is open, a wireless signal is sent to the message recording and reminder device 304 to activate a prerecorded message. In one embodiment, when the vehicle door sensor 318 determines that the vehicle door is closed, a wireless signal is sent to the message recording and reminder device 304 to activate a prerecorded message.

When the vehicle ignition is turned on using a key, the message reminder and charging device 300 utilizes the vehicle's power to set off the prerecorded message, which is heard on the speaker 315. This prerecorded message may be the manufacturer's default message or a prerecorded customized message. For a keyless vehicle, when the car is turned on, the message reminder and charging device 300 does not activate. Upon opening and closing of any door after the car has been started using a keyless starter, the message reminder and charging device 300 activates and the prerecorded message is heard. When the vehicle is turned off, the message reminder and charging device 300 activates and another prerecorded message, which can be the same as or different from the first message, is heard on the speaker 315. Like the first message, this message can be the manufacturer's default message or can be a prerecorded customized message. The user can pre-record a customized message, by holding down the first push button 313 or the second push button 314. This action deletes the corresponding manufacturer's default messages. After deleting the default message, the user records a customized message by speaking into the microphone 317. The recording of the customized message can be done in any location whether inside or outside the vehicle.

Figure 9:
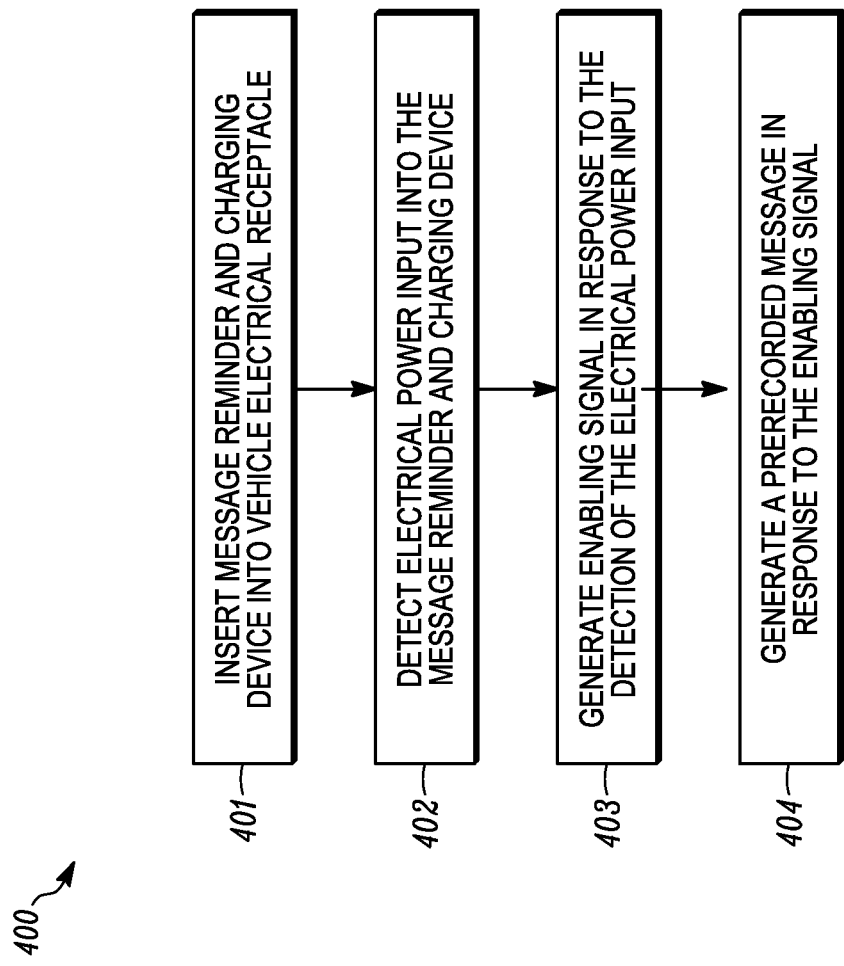
FIG. 9 is a block diagram illustrating an exemplary method of generating a signal using an exemplary message reminder and charging device.

FIG. 9 illustrates a method 400 for generating a message from message reminder and charging device. The method includes: inserting the message reminder and charging device into the vehicle electrical receptacle 401; detecting an electrical power input into the message reminder and charging device 402; generating an enabling signal in response to the detection of the electrical power input 403; and generating a prerecorded message in response to the enabling signal 404.

Figure 10:
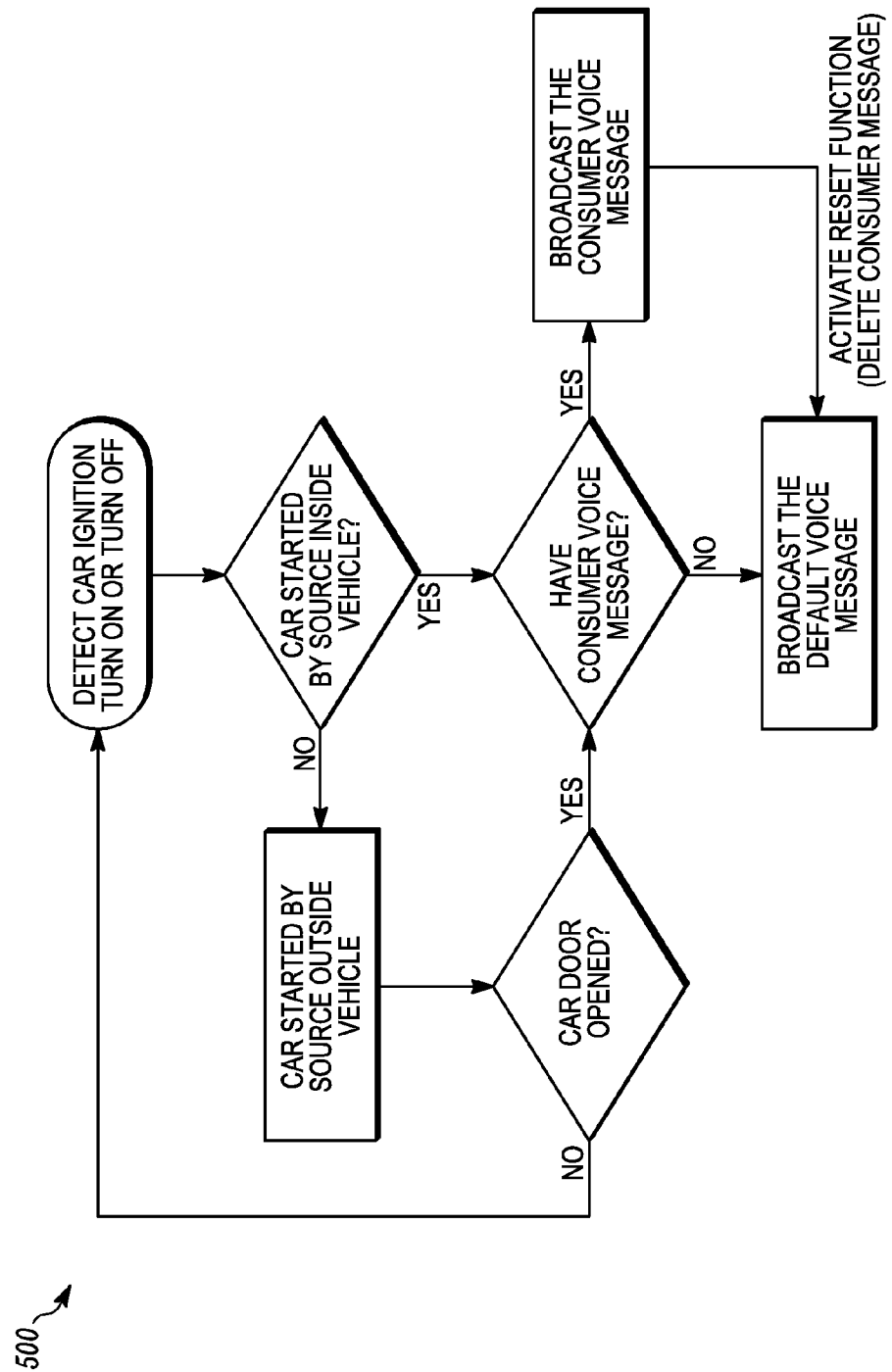
FIG. 10 is a block diagram illustrating an exemplary method of using an exemplary message reminder and charging device.

FIG. 10 is a block diagram illustrating an exemplary method of using an exemplary message reminder and charging device 500. In method 500, the message reminder and charging device 300 detects whether the car ignition is turned on or off. The message reminder and charging device 300 next determines if the car is started by a source inside the vehicle. If the car is started by a source inside the vehicle, then the message reminder and charging device 300 determines if there is a consumer voice message. If there is a consumer voice message, then the message reminder and charging device 300 broadcasts the consumer voice message. If there is no consumer voice message, then the message reminder and charging device 300 broadcasts the default message.

However, if the message reminder and charging device 300 determines that the car is started by a source outside the vehicle, the message reminder and charging device 300 next determines if a car door is opened. If a car door is opened, then the message reminder and charging device 300 determines if there is a consumer voice message. If there is a consumer voice message, then the message reminder and charging device 300 broadcasts the consumer voice message. If there is no consumer voice message, then the message reminder and charging device 300 broadcasts the default message.

Moreover, it the message reminder and charging device 300 determines that a car door is not opened, then it determines if the car ignition is turned on or off.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B, C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance or component fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicant reserves the right to physically incorporate into this specification any and all materials and information from any such patents, applications, publications, scientific articles, web sites, electronically available information, and other referenced materials or documents. Applicant reserves the right to physically incorporate into any part of this document, including any part of the written description, the claims referred to above including but not limited to any original claims.

What is claimed is:

1. A message reminder and charging device for a portable electronic device for use in a vehicle having an electrical receptacle, the message reminder and charging device comprising:
a housing having a proximal end, a distal end, and an exterior surface in between the proximal end and the distal end,
wherein the proximal end of the housing is dimensioned for a slip fit engagement into a vehicle electrical receptacle,
a charging device disposed within the housing and comprising:
a charging integrated circuit;
one positive electrical contact for electrically communicating with two complementary positive electrical contacts disposed within the vehicle electrical receptacle;
two negative electrical contacts for electrically communicating with two complementary negative electrical contacts disposed within the vehicle electrical receptacle; and
a Universal Serial Bus (USB) receptacle that protrudes from the distal end or from the exterior surface of the housing,
wherein the charging integrated circuit is in electrical communication with the one positive electrical contact, the two negative electrical contacts, and the Universal Serial Bus (USB) receptacle;
a message recording and reminder device disposed within the housing and comprising:
a flash memory integrated circuit;
a main control integrated circuit;
an amplifier;
a first push button;
a second push button;
a speaker;
an auxiliary battery, and a microphone,
wherein the flash memory integrated circuit is in electrical communication with the main control integrated circuit,
wherein the main control integrated circuit is in electrical communication with the first push button, the second push button, the microphone, and the amplifier,
wherein the amplifier is in electrical communication with the speaker and the flash memory integrated circuit, and
wherein the message recording and reminder device is in electrical communication to the charging integrated circuit disposed within the housing.

2. The message reminder and charging device of claim 1, wherein the portable electronic device comprises a cellular phone, an external backup battery, a MP3 music player, a tablet computer, laptop computer, a personal digital assistant, a video game console, or a combination thereof.

3. The message reminder and charging device of claim 2, wherein the portable electronic device comprises a cellular phone.

4. The message reminder and charging device of claim 1, wherein the first push button is used to record a first customized message to be broadcasted when a vehicle ignition is turned on or when the message reminder and charging device is plugged into the vehicle electrical receptacle and wherein the second push button is used to record a second customized message to be broadcasted when a vehicle ignition is turned off or when the message reminder and charging device is unplugged from the electrical receptacle of a vehicle.

5. The message reminder and charging device of claim 1, wherein the charging device converts an electrical power input at the vehicle electrical receptacle to a signal level accepted by the portable electronic device.

6. The message reminder and charging device of claim 5, wherein the electrical power input is received upon plugging the message reminder and charging device into the vehicle electrical receptacle when the vehicle is not running when an ignition key is turned to power an accessory power outlet.

7. The message reminder and charging device of claim 5, wherein the electrical power input is received upon plugging the message reminder and charging device into the vehicle electrical receptacle when the vehicle is running.

8. The message reminder and charging device of claim 5, wherein the electrical power input is an automobile direct current (DC) power input.

9. A message reminder and charging device for a cellular phone for use in a vehicle having an electrical receptacle, the message reminder and charging device comprising:
a housing having a proximal end, a distal end, and an exterior surface in between the proximal end and the distal end,
wherein the proximal end of the housing is dimensioned for a slip fit engagement into a vehicle electrical receptacle,
a charging device disposed within the housing and comprising:
a charging integrated circuit;
one positive electrical contact for electrically communicating with two complementary positive electrical contacts disposed within the vehicle electrical receptacle;
two negative electrical contacts for electrically communicating with two complementary negative electrical contacts disposed within the vehicle electrical receptacle; and
a Universal Serial Bus (USB) receptacle that protrudes from the distal end of the housing,
wherein the charging integrated circuit is in electrical communication with the one positive electrical contact, the two negative electrical contacts, and the Universal Serial Bus (USB) receptacle;
a message recording and reminder device disposed within the housing and comprising:
a flash memory integrated circuit;
a main control integrated circuit;
an amplifier;
a first push button;
a second push button;
a speaker;
an auxiliary battery, and
a microphone,
wherein the flash memory integrated circuit is in electrical communication with the main control integrated circuit,
wherein the main control integrated circuit is in electrical communication with the first push button, the second push button, the microphone, and the amplifier,
wherein the amplifier is in electrical communication with the speaker and the flash memory integrated circuit, and
wherein the message recording and reminder device is in electrical communication to the charging integrated circuit disposed within the housing.

10. The message reminder and charging device of claim 9, wherein the first push button is used to record a first customized message to be broadcasted when a vehicle ignition is turned on or when the message reminder and charging device is plugged into the vehicle electrical receptacle and wherein the second push button is used to record a second customized message to be broadcasted when a vehicle ignition is turned off or when the message reminder and charging device is unplugged from the electrical receptacle of a vehicle.

11. The message reminder and charging device of claim 9, wherein the charging device converts an electrical power input at the vehicle electrical receptacle to a signal level accepted by the cellular phone.

12. The message reminder and charging device of claim 11, wherein the electrical power input is received upon plugging the message reminder and charging device into the vehicle electrical receptacle when the vehicle is not running when an ignition key is turned to power an accessory power outlet.

13. The message reminder and charging device of claim 11, wherein the electrical power input is received upon plugging the message reminder and charging device into the vehicle electrical receptacle when the vehicle is running.

14. The message reminder and charging device of claim 11, wherein the electrical power input is an automobile direct current (DC) power input.

15. A message reminder and charging device for a cellular phone for use in a vehicle having an electrical receptacle, the message reminder and charging device comprising:
a housing having a proximal end, a distal end, and an exterior surface in between the proximal end and the distal end,
wherein the proximal end of the housing is dimensioned for a slip fit engagement into a vehicle electrical receptacle,
a charging device disposed within the housing and comprising:
a charging integrated circuit;

one positive electrical contact for electrically communicating with two complementary positive electrical contacts disposed within the vehicle electrical receptacle;

two negative electrical contacts for electrically communicating with two complementary negative electrical contacts disposed within the vehicle electrical receptacle; and a Universal Serial Bus (USB) receptacle that protrudes from the exterior surface of the housing, wherein the charging integrated circuit is in electrical communication with the one positive electrical contact, the two negative electrical contacts, and the Universal Serial Bus (USB) receptacle;

a message recording and reminder device disposed within the housing and comprising:

a flash memory integrated circuit;

a main control integrated circuit;

an amplifier;

a first push button;

a second push button;

a speaker;

an auxiliary battery, and a microphone, wherein the flash memory integrated circuit is in electrical communication with the main control integrated circuit, wherein the main control integrated circuit is in electrical communication with the first push button, the second push button, the microphone, and the amplifier, wherein the amplifier is in electrical communication with the speaker and the flash memory integrated circuit, and wherein the message recording and reminder device is in electrical communication to the charging integrated circuit disposed within the housing.

16. The message reminder and charging device of claim 15, wherein the first push button is used to record a first customized message to be broadcasted when a vehicle ignition is turned on or when the message reminder and charging device is plugged into the vehicle electrical receptacle and wherein the second push button is used to record a second customized message to be broadcasted when a vehicle ignition is turned off or when the message reminder and charging device is unplugged from the electrical receptacle of a vehicle.

17. The message reminder and charging device of claim 15, wherein the charging device converts an electrical power input at the vehicle electrical receptacle to a signal level accepted by the cellular phone.

18. The message reminder and charging device of claim 17, wherein the electrical power input is received upon plugging the message reminder and charging device into the vehicle electrical receptacle when the vehicle is not running when an ignition key is turned to power an accessory power outlet.

19. The message reminder and charging device of claim 17, wherein the electrical power input is received upon plugging the message reminder and charging device into the vehicle electrical receptacle when the vehicle is running.

20. The message reminder and charging device of claim 17, wherein the electrical power input is an automobile direct current (DC) power input.

* * * * *